United States Patent
Campos et al.

(10) Patent No.: US 9,729,235 B2
(45) Date of Patent: Aug. 8, 2017

(54) MULTI-LINK MOBILE COMMUNICATIONS

(71) Applicant: Cable Television Laboratories, Inc., Louisville, CO (US)

(72) Inventors: Luis Alberto Campos, Superior, CA (US); Alireza Babaei, Westminster, CO (US); Thomas H. Williams, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/486,297

(22) Filed: Sep. 15, 2014

(65) Prior Publication Data
US 2016/0080086 A1 Mar. 17, 2016

Related U.S. Application Data

(60) Provisional application No. 62/030,474, filed on Jul. 29, 2014.

(51) Int. Cl.
*H04B 10/2575* (2013.01)
*H04B 10/50* (2013.01)
*H04B 10/114* (2013.01)
*H04B 10/112* (2013.01)

(52) U.S. Cl.
CPC ..... *H04B 10/1141* (2013.01); *H04B 10/1121* (2013.01)

(58) Field of Classification Search
None
See application file for complete search history.

(56) References Cited

U.S. PATENT DOCUMENTS

| | | | | |
|---|---|---|---|---|
| 2009/0310971 A1* | 12/2009 | Kim | ............... | H04B 10/1149 398/103 |
| 2011/0064420 A1* | 3/2011 | Rajagopal | .......... | H04B 10/1125 398/154 |
| 2011/0116805 A1* | 5/2011 | Xia | ............... | H04B 10/1121 398/131 |
| 2013/0010675 A1* | 1/2013 | Huen | ............ | H04B 10/1129 370/315 |
| 2013/0051264 A1* | 2/2013 | Wang | ............... | H04L 5/0098 370/252 |
| 2013/0202301 A1* | 8/2013 | Ago | ............... | H05B 37/0245 398/58 |

(Continued)

*Primary Examiner* — Shi K Li
*Assistant Examiner* — Mina Shalaby
(74) *Attorney, Agent, or Firm* — Duft Bornsen & Fettig LLP; Gregory T. Fettig

(57) ABSTRACT

Systems and methods presented herein provide for improved access to data. In one embodiment, a communication system includes an RF communication link that is operable to receive first communications from a mobile device (e.g., a cell phone, tablet computer, laptop computer, or other "user equipment"). The communication system also includes a processor operable to determine a location of the mobile device based on the first communications and a plurality of directional communication links. Each directional communication link is operable to transfer data to the mobile device based on the location of the mobile device as determined by the processor. The processor is also operable to coordinate the transfer of data from each of the directional communication links to the mobile device.

20 Claims, 9 Drawing Sheets

(56) References Cited

U.S. PATENT DOCUMENTS

2014/0226977 A1* 8/2014 Jovicic ................ H04B 10/116
                                                    398/26
2014/0255036 A1* 9/2014 Jovicic ................ H04B 10/116
                                                    398/115

* cited by examiner

MULTI-LINK MOBILE COMMUNICATIONS

CROSS REFERENCE TO RELATED APPLICATIONS

This patent application claims priority to, and thus the benefit of an earlier filing date from, U.S. Provisional Patent Application No. 62/030,474 (filed Jul. 29, 2014), the entire contents of which are hereby incorporated by reference.

BACKGROUND

Cellular telephony continues to evolve at a rapid pace because users have increasingly demanded access to more mobile communications. And, the demand for mobile data and content, such as movies and music, has also increased dramatically as a result. However, data rates through traditional Radio Frequency (RF) cellular telephony are relatively slow for the amount of data desired by mobile equipment users. For example, downlink data rates in Long Term Evolution (LTE) in the United States have been marketed as reaching 300 Megabits per second. But, digital movies and other data can be on the order of Gigabytes. And, when cellular telephony base stations are overloaded with users, downlink data rates can decrease significantly, thereby making larger data transfers impractical.

SUMMARY

Systems and methods presented herein provide for improved access to data. In one embodiment, a communication system includes an RF communication link that is operable to receive first communications from a mobile device (e.g., a cell phone, tablet computer, laptop computer, or other "user equipment"). The communication system also includes a processor operable to determine a location of the mobile device based on the first communications and a plurality of directional communication links. Each directional communication link is operable to transfer data to the mobile device based on the location of the mobile device as determined by the processor. The processor is also operable to coordinate the transfer of data from each of the directional communication links to the mobile device. For example, the processor may direct the first directional communication link to transfer the portion of a larger data transfer to the mobile device. Then, as the mobile device moves from its location, the processor directs another of the directional communication links to transfer another portion of the data transfer.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1A:
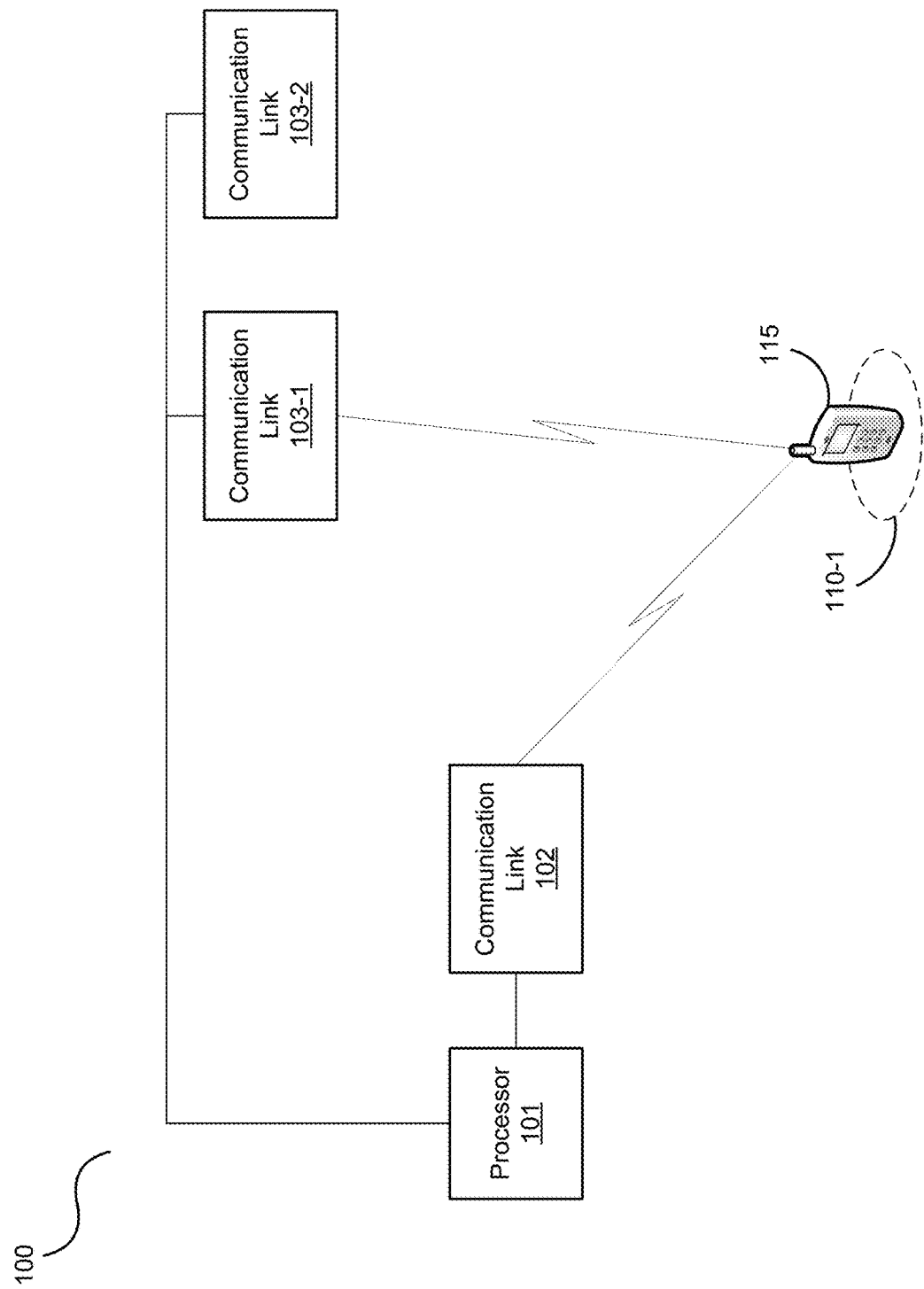
FIGS. 1A and 1B are block diagrams of an exemplary multi-link mobile communication system.
Figure 1B:
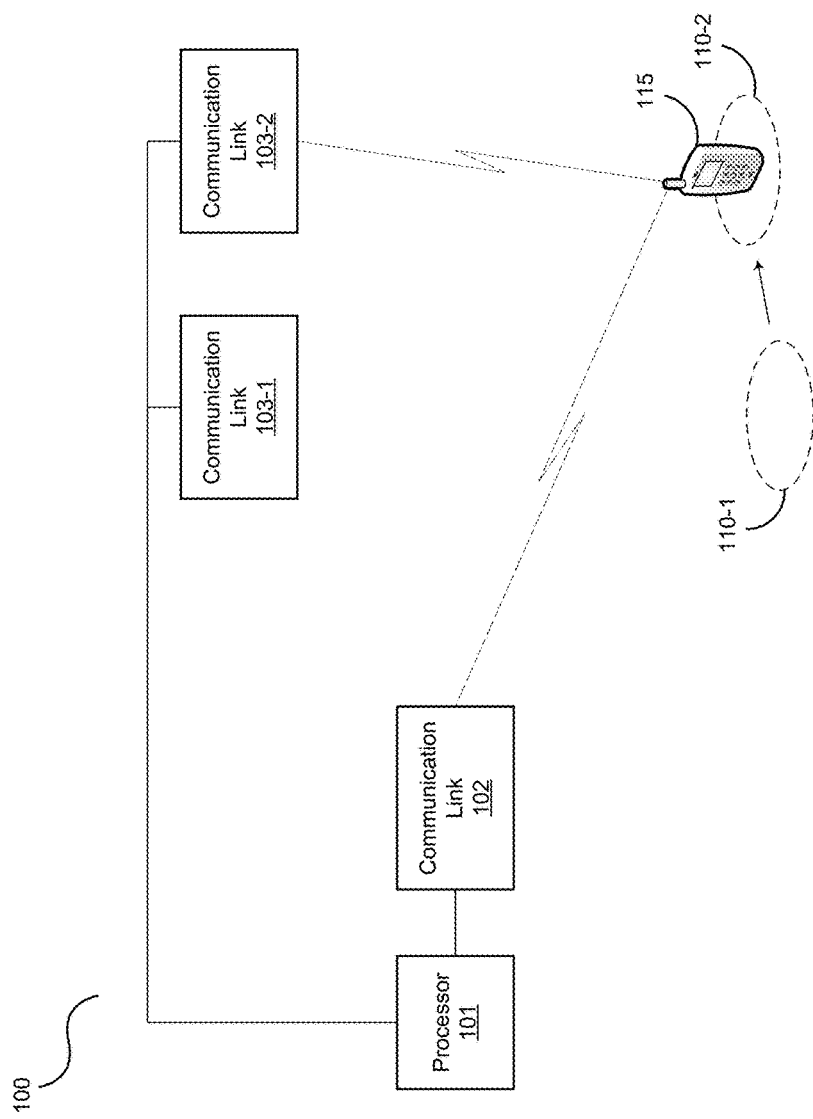

FIGS. 1A and 1B are block diagrams of an exemplary multi-link mobile communication system 100. The communication system 100 includes a communication link 102 and a plurality of directional communication links 103. The communication link 102 is operable to receive RF communications from a mobile device 115 that allows a processor 101 to determine its location 110-1. For example, the mobile device 115 may transfer GPS data and/or other data that may be used to determine the device's location 110-1 as illustrated in FIG. 1A. Another method to locate the mobile device 115 is by way of a delay time between the mobile device 115 and the communications links 103 and/or 102 (e.g., a delta in signal arrival times). This data is also used to predict a subsequent location of the mobile device 115 as illustrated with location 110-2 in FIG. 1B. Based on the predicted location of the mobile device 115, the processor 101 then coordinates the transfer of larger data from the communication links 103-1 and 103-2 as the mobile device 115 moves about based on its predicted locations.

Thus, the processor 101 is any device, system, software, or combination thereof operable to process information from a mobile device 115 to predict its movement so as to direct one or more communication links along its path to transfer data to the mobile device 115. The communication links 103 are generally directional and may be implemented in a variety of ways as a matter of design choice. For example, the communication links 103 may be implemented as lasers that optically transfer data to the mobile device 115. Alternatively or additionally, the communication links 103 may be implemented as directional RF links, such as microwave links, that transfer data to the mobile device over a relatively tight beam width of RF energy. Additional operational details regarding the communication system 100 are shown and described in the flowchart of FIG. 2.

Figure 2:
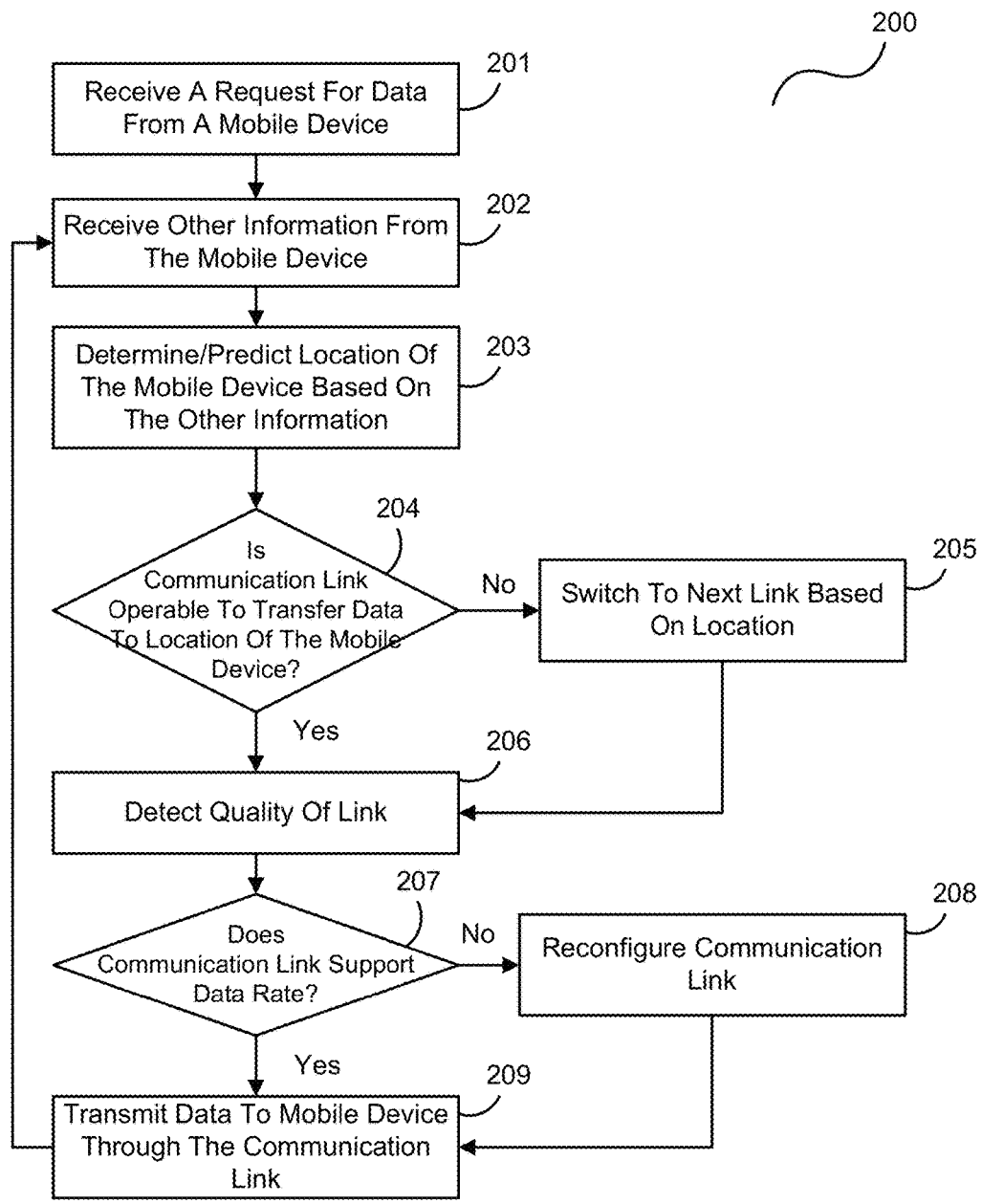
FIG. 2 is a flowchart of a process operable with the mobile communication system 100 of FIGS. 1A and 1B.

In FIG. 2, the process 200 initiates when a request for data is received from the mobile device 115, in the process element 201. For example, mobile device 150 may be a cell phone communicating with base stations in a cellular telephony network. In this regard, the mobile device 115 may transfer certain data to the base stations along its path as the mobile device 115 traverses through the cellular telephony network. At some point in time, a user of the mobile device 115 may request the transfer of a relatively large amount of data (e.g., content such as movies, music, video games, etc.). That request is then processed by the processor 101 which in turn retrieves the requested data from some back office system, such as a content server. In this regard, the processor 101 may also determine whether the mobile device 115 is authorized access to the content. For example, the processor 101 may process an identifier of the mobile device 115 that determines whether the user of the mobile device 115 is a subscriber to requested content. In addition to the request, the processor 101 receives and processes other information pertaining to the mobile device 115, in the process element 202. Examples of such information include Global Positioning System (GPS), mapping information, speed information, and the like.

Once the other information pertaining to the mobile device 115 is received, the processor 101 determines and predicts future locations of the mobile device 115 based on that information, in the process element 203. Based on the determined/predicted locations, the processor 101 can determine whether a particular communication link is operable to transfer data to a location of the mobile device 115, in the process element 204. For example, in FIG. 1A, the mobile device 115 is located at the location 110-1. The processor 101 determines that the communication link 103-1 can transfer relatively large amounts of data to the mobile device 115. In this regard, the processor 101 may also determine that the communication link 103-2 is fairly inoperable to transfer such a large amount of data to the mobile device 115 given its current location 110-1. Accordingly, the processor 101 directs the communication link 103-1 to transfer the data to the mobile device 115.

In transferring the data to the mobile device 115, the processor 101 may detect the quality of the communication link 103, in the process element 206, so as to make adjustments to the link if necessary. If, however, a particular communication link 103 is not operable to transfer the data to the mobile device 115, the processor 101 switches to the next communication link 103 based on the next predicted location of the mobile device 115, in the process element 205. For example, as the mobile device 115 moves from the location 110-1 (FIG. 1A) to the predicted location 110-2 (FIG. 1B), the processor 101 may determine that the communication link 103-2 is more able to transfer the data to the mobile device 115. Accordingly, processor 101 directs the communication link 103-2 to transfer the data to the mobile device 115. More specifically, the processor 101 predicts the future location 110-2 of the mobile device 115 so as to coordinate the data transfer from the communication links 103-1 and 103-2 to the mobile device 115. In other words, the processor 101 controls the handoffs of data transfers from the communication links 103 based on the predicted locations of the mobile device 115. Such may entail bursting a portion of larger data to the mobile device 115 from a first communication link 103 such that the amount of the completed portion of data transfer is known and that a subsequent portion of the data can be burst to the mobile device in another burst (e.g. from another communication link 103).

As mentioned, while data is being prepared for transfer to the mobile device 115 from a particular communication link 103, the processor 101 may detect the quality, in the process element 206. This detection may be used to determine a data rate that the communication link 103 may support, in the process element 207. For example, if the communication link 103 at a particular data rate is degraded, the processor 101 may reconfigure the communication link 103, in the process element 208, to optimize the data transfer at a lower data rate. Alternatively, if the processor 101 detects that the communication link supports a higher data rate, then the processor 101 may reconfigure the link to increase the data rate of the data transfer. Once the supported data rate is determined, the processor 101 directs the communication link 103 to transmit the data to the mobile device 115, in the process element 209, until for example the next location 110 is predicted by the processor 101 from the received information of the mobile device 115.

Figure 3:
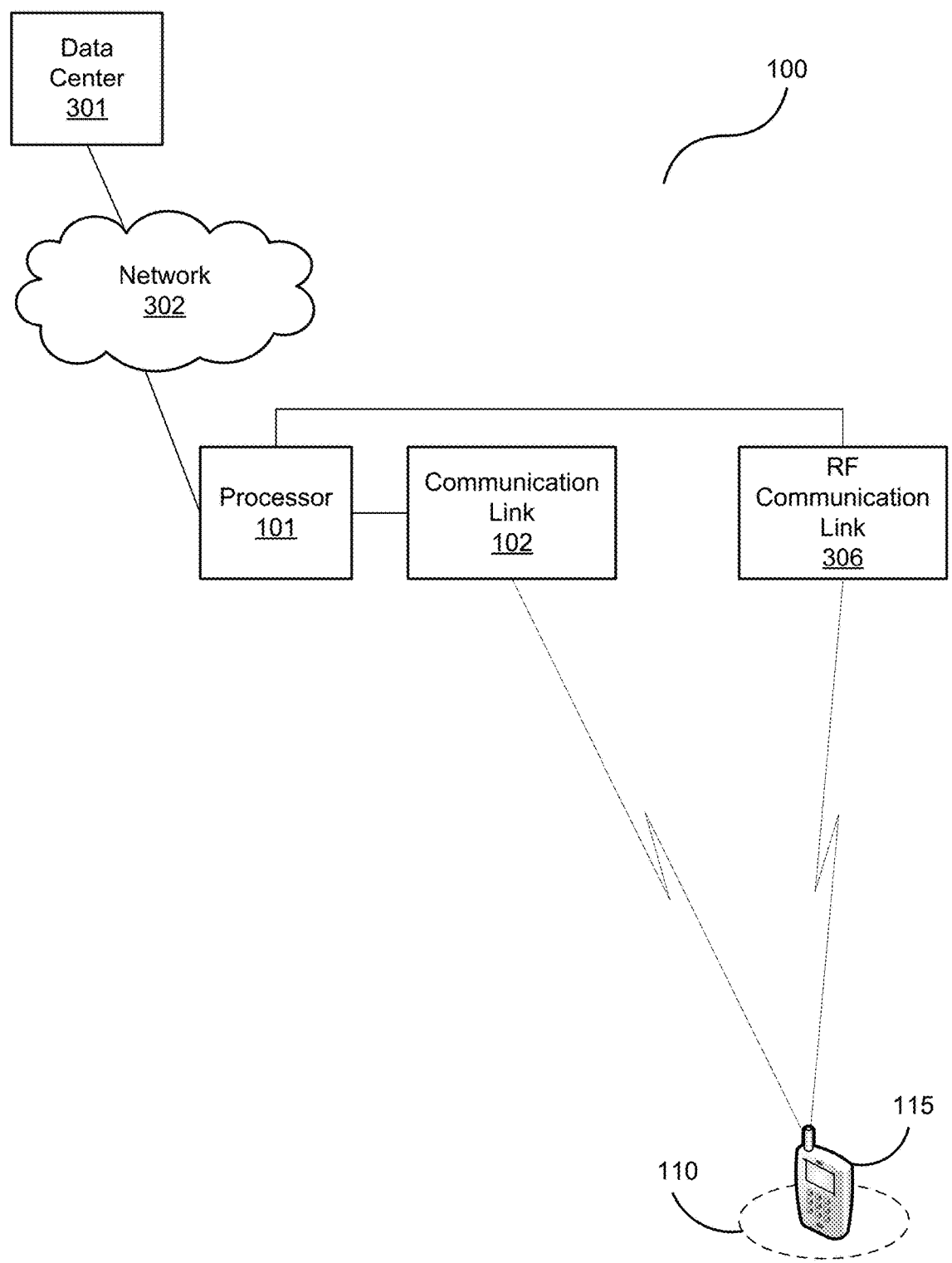
FIGS. 3 and 4 are block diagrams of the system of FIGS. 1A and 1B employing different types of exemplary communication links.

In an RF example as illustrated in FIG. 3, the communication links (e.g., RF communication link 306) may be highly directional RF links such as microwave links that have much tighter RF beam widths than lower frequency broadcasts links found in base stations of traditional cellular telephony. However, when a degraded quality of the communication link is detected, the processor 101 may reconfigure the communication link 306 to optimize the data transfer to the mobile device 115. For example, at one frequency, the communication link 306 may experience interference. Accordingly, the processor 101 may direct the communication link 306 to download data to the mobile device 115 at another frequency.

In one embodiment, the RF communication link 306 is "steerable". For example, at microwave frequencies (e.g., in the 60 GHz range), RF communications can be and typically are very directional. To accomplish steering at such frequencies, the RF communication link 306 may employ a phased array antenna. A phased array is an array of antenna elements in which the relative phases of the respective signals feeding the elements are varied in such a way that the effective radiation pattern of the array is reinforced in a particular desired direction and suppressed in other undesired directions. The processor 101, in this regard, may control the phases of the signals to the antenna elements to direct the RF communication link 306 to the mobile device 115 as it moves (e.g., based on a location prediction algorithm). However, the invention is not intended to be limited to any particular form of directional RF.

Figure 4:
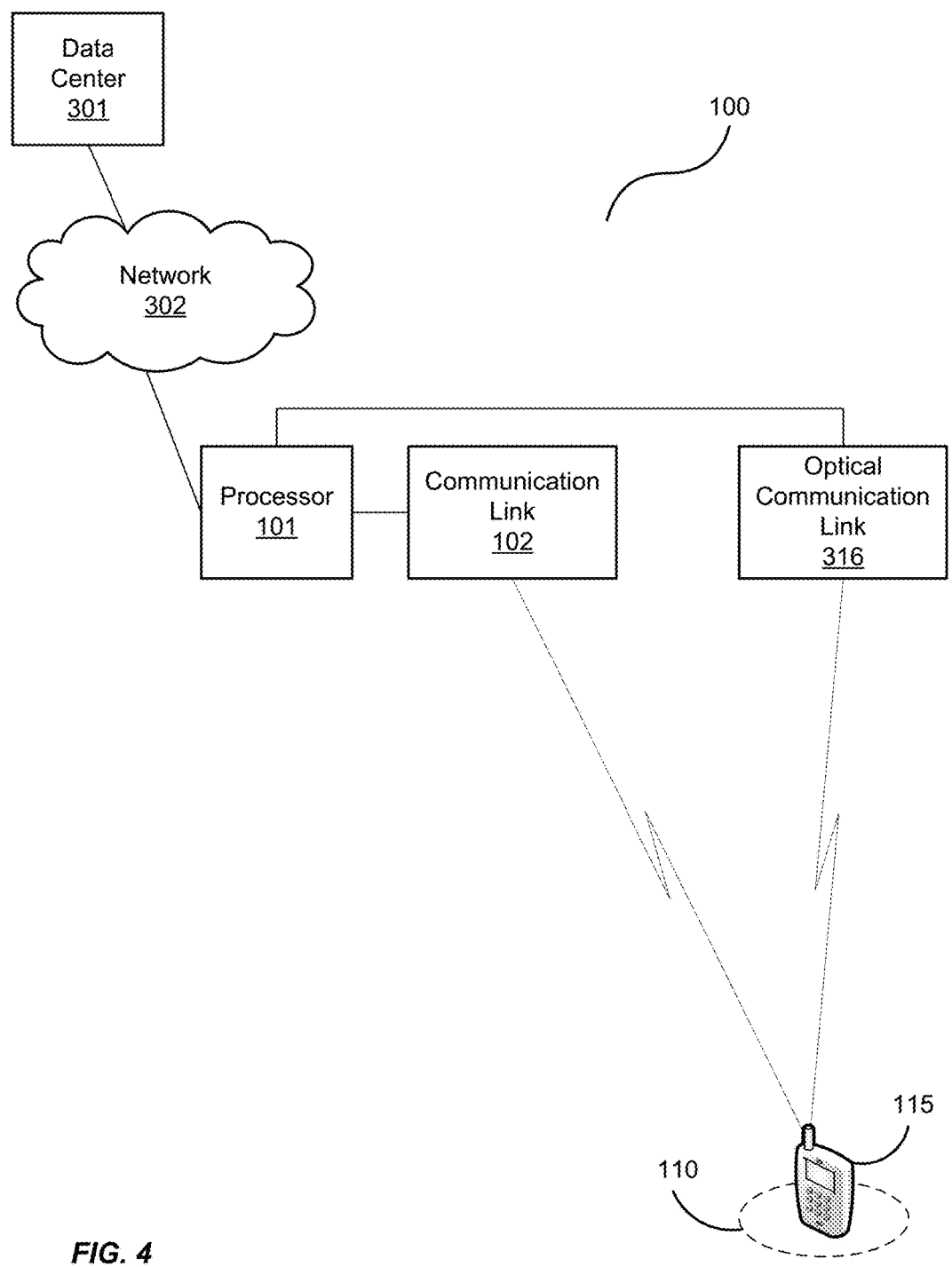

In an optical example as illustrated in FIG. 4, the communication links (e.g., optical communication link 316) may be lasers capable of relatively high data rates to the mobile device 115. However, certain conditions between the laser and the mobile device 115 (e.g., fog, air quality, etc.) may obscure relatively tight laser communications. Accordingly, the processor 101 may reconfigure the optical communication link 316 to optimize the data transferred to the mobile device 115. In this optical example, such may include enlarging a beam width of the laser signal to the mobile device 115 even though that may result in a lower data rate. Still, the lower capability of the optical link may provide much faster data rates that traditional cellular telephony downloads. Alternatively or additionally, the optical intensity of the communication link to the mobile device 115 may be increased and/or the wavelength may be switched. In either the RF case or the optical case, it should again be noted that the data rate may be increased if a higher quality is detected in the process element 206. Moreover, a focus of the optical communication link to the mobile device 115 may be altered.

Also illustrated in the exemplary embodiments of FIGS. 3 and 4 are the data center 301 and the network 302. The processor 101 may be coupled to the network 302 to access the data center 301 to retrieve data on behalf of the mobile device 115. For example, datacenters such as Amazon.com and Netflix.com provide digital movies and other digital media to subscribers. The processor 101 may be representative of a high data rate intermediary such as a cable operator to provide the digital media from the data center 301 to the mobile device 115 via the communication links mentioned herein.

Figure 5A:
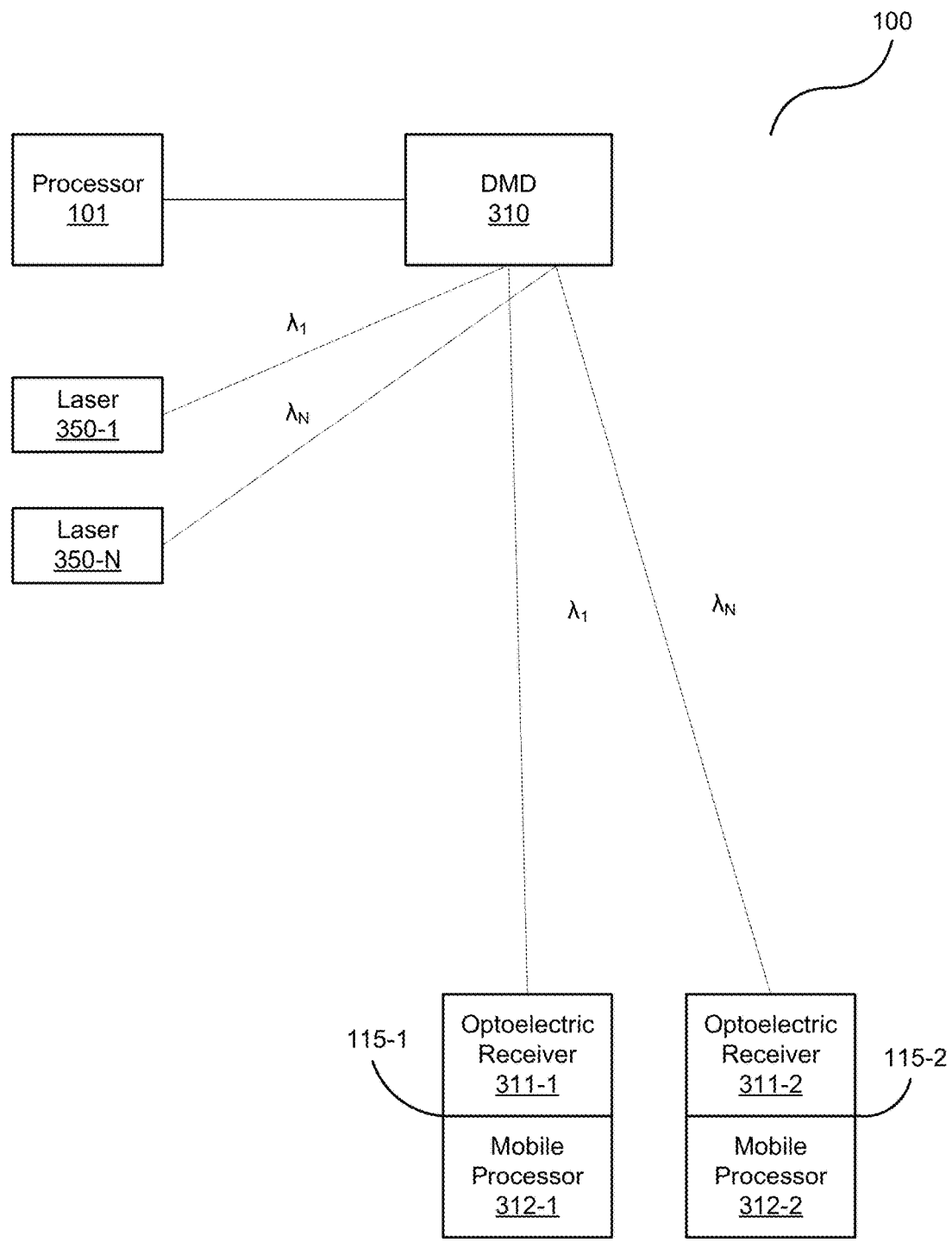
FIG. 5A is a block diagram of the system of FIGS. 1A and 1B employing lasers as exemplary optical communication links.

FIG. 5A is a block diagram of one exemplary embodiment of the system 100 employing lasers 350 as optical communication links to the mobile device 115. In this embodiment, the system 100 employs a Digital Micromirror Device (DMD) 310 that is operable to direct laser light to a plurality of mobile devices. For example, a first laser 350-1 may be operable to optically transmit data at a first optical wavelength $\lambda_1$ and a second laser 350-2 may be operable to optically transmit data at a second optical wavelength $\lambda_2$. The processor 101 may be used to control individual mirrors of the DMD 310 and accordingly direct the laser light to its intended target. The sharing of the DMD 310 may be performed on a time-division multiplexing basis and/or be based on some percentage of the number of micromirrors in the DMD 310.

In this instance, the DMD 310 directs the first optical wavelength $\lambda_1$ to the mobile device 115-1 where it is received by the optoelectric receiver 311-1 and processed by the mobile processor 312-1 of the mobile device 115-1. The mobile device 115-1 may then make the data available to a user of the mobile device 115-1 (e.g., display a movie on a display unit of the mobile device 115-1, play music through the speakers of the mobile device 115-1, etc.). Similarly, the DMD 310 directs the second optical wavelength $\lambda_2$ to the mobile device 115-2 where it is received by the optoelectric receiver 311-2 and processed by the mobile processor 312-2 of the mobile device 115-2.

Examples of the DMD 310 have been used frequently in industry including the use of digital light projection (DLP) in television technology. The DMD 310 in this embodiment provides an advantageous directional laser propagation to reach multiple users through their corresponding mobile devices 115. And, as DMDs can be configured with millions of mirrors, the DMD 310 can serve many subscribers. Although the mirrors propagate the light directly to individual mobile devices 115, the separate wavelengths of the lasers further ensure reliability of the optical transmissions because they provide separate channels that do not interfere with one another. In other embodiments, light emitting diodes (LEDs) may be used in place of the lasers 350.

Although shown and described with respect to multiple lasers being operable with the DMD 310, the invention is not intended to be limited to the exemplary embodiments. Rather, a single laser may be operable with the DMD 310 to direct downlink communications to one or more mobile devices 115. For example, a laser 350 may be directed to propagate a beam to one mirror (or a set of mirrors) on the DMD 310 such that the beam is directed to a first mobile device 115-1. Thereafter, the laser 350 may be directed to propagate the beam to another mirror (or a set of mirrors) on the DMD 310 such that the beam is directed to the same mobile device 115-1 as it moves, or even another mobile device 115-2. Accordingly, the number of lasers 350 and/or the manner in which the DMD 310 is controlled may be configured as a matter of design choice.

Figure 5B:
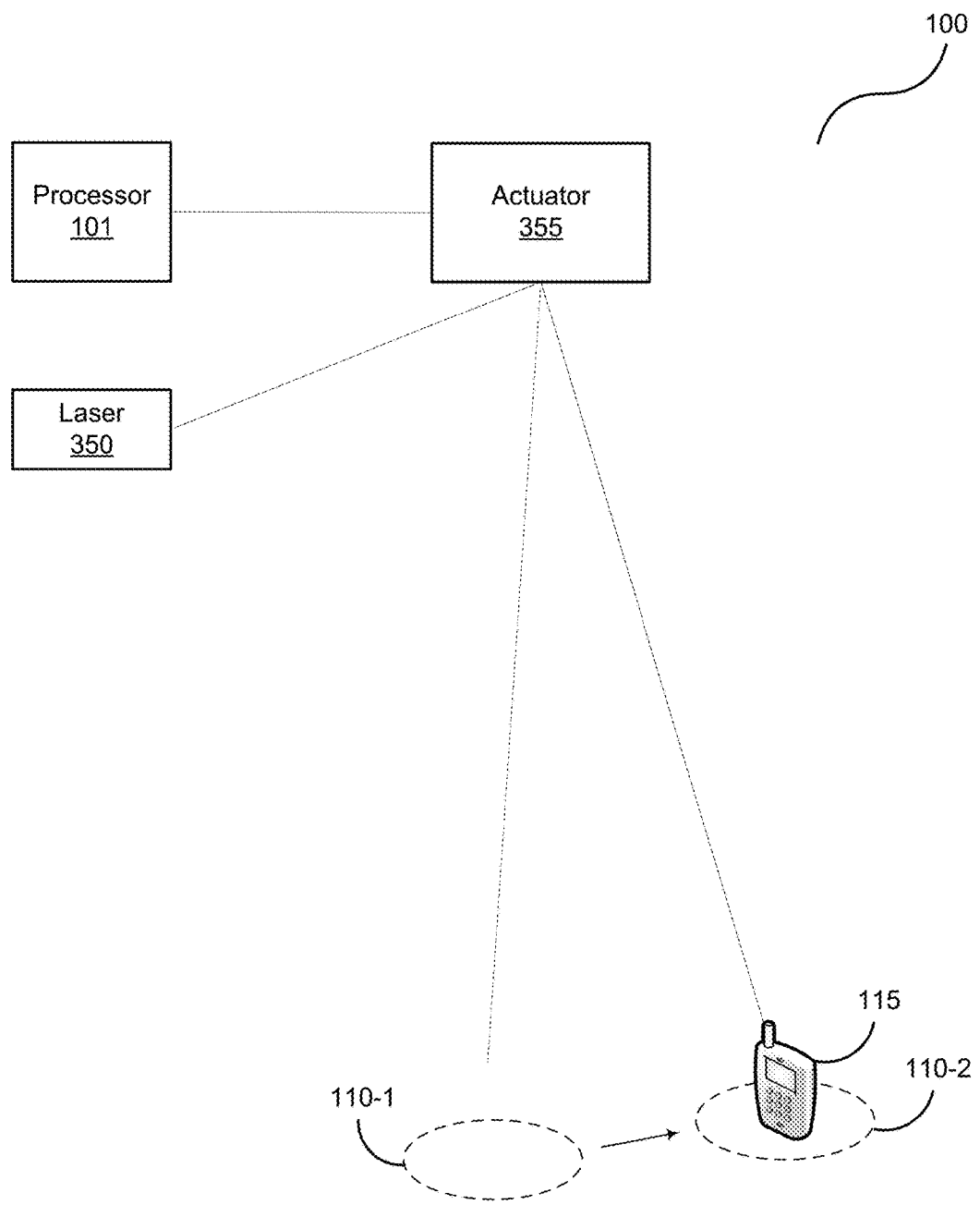
FIG. 5B is a block diagram of the system of FIGS. 1A and 1B employing a laser as an exemplary optical communication link.

In FIG. 5B, another laser embodiment is illustrated as being operable with the system 100 of FIGS. 1A and 1B. In this embodiment, the laser 350 propagates a laser beam to the mobile device 115 via a laser actuator 355 when the device is in motion. For example, the actuator 355 may have a servo controlled mirror. The processor 101 may use a prediction algorithm to track/predict the movement of the mobile device 115. In this example then, the processor 101 may control the position of the servo controlled mirror of the actuator 355 to direct the laser beam from the first location 110-1 to the second location 110-2 where the mobile device 115 has moved and deliver the downlink medications to the mobile device 115 via the laser beam.

The laser beam from the laser 350 may be continuous or discrete. For example, the processor 101 may direct the laser 350 to beam the downlink communications to the mobile device 115 at the first location 110-1, switch off, and continue beaming the downlink communications to the mobile device 115 when it is at its second location 110-2. Alternatively, the processor 101, in predicting the movement of the mobile device 115, may control the actuator 355 to direct the laser beam in a continuous fashion along the path from the location 110-1 to the location 110-2.

Figure 6:
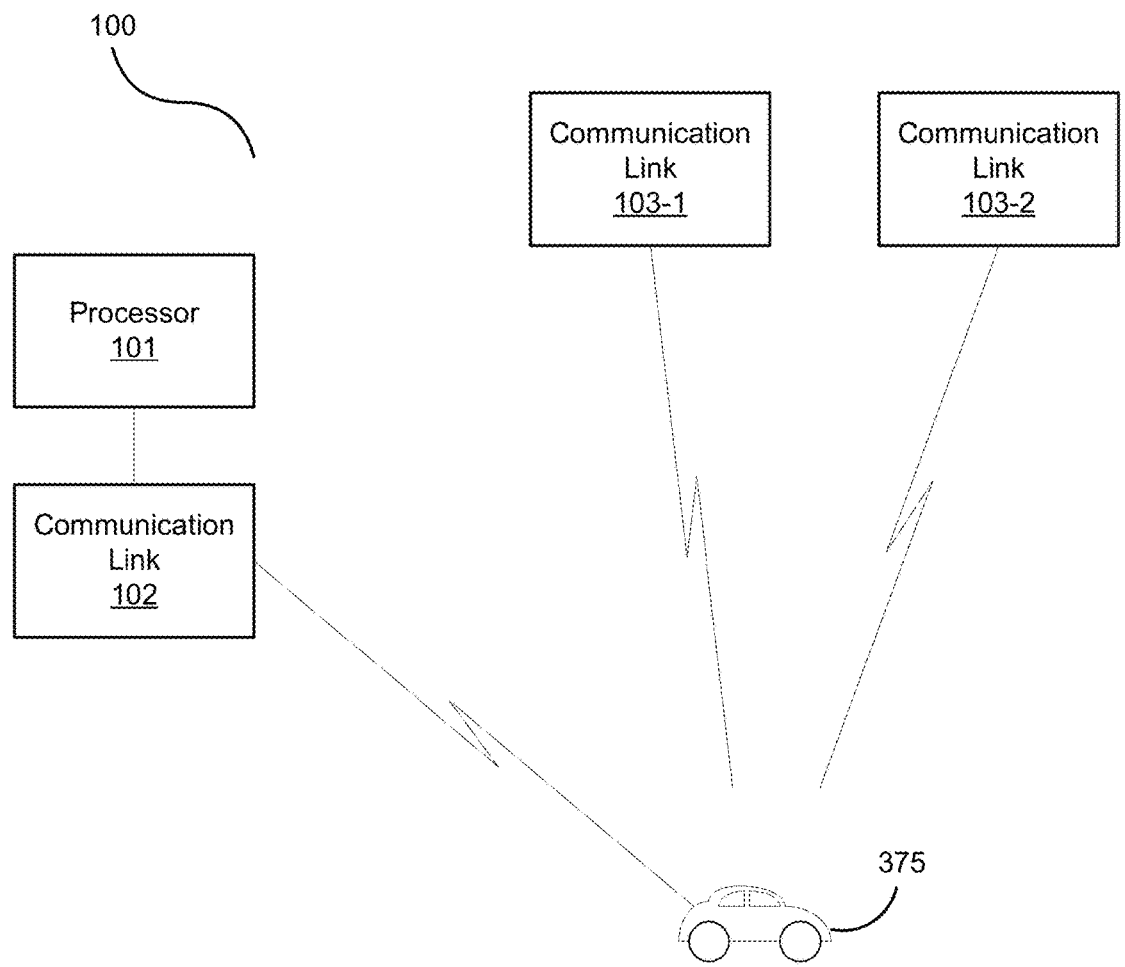
FIG. 6 is a block diagram of a vehicle operable within the system of FIGS. 1A and 1B.

FIG. 6 is a block diagram of a vehicle 375 (e.g., a car) operable within the system 100. The vehicle 375 provides a unique challenge to providing mobile data. For example, a person walking about with a mobile device 150 does not generally travel great distances. Accordingly, data can be delivered to their mobile devices with relative ease using a broadcast antenna. Automobiles travel at a greater rate of speed making location predictions more difficult. When the mobile device 115 is operable with, within, or as part of a vehicle 375 such as a car, the mobile device 115 can quickly exit from the range of the broadcast antenna. Also, broadcast RF bands are highly congested and susceptible to many forms of interference. Directional communication links disclosed herein alleviate these and other problems.

The processor 101 as mentioned above is operable to predict various locations 110 of the vehicle 375 as it traverses along its route. A variety of prediction algorithms have been proposed and the processor 101 may be configured to implement any of these prediction algorithms as a matter of design choice. One example of a prediction algorithm is "Real-Time Destination Prediction Based on Efficient Routes" provided by John Krumm of Microsoft research (Paper Number 2006-01-0811). Other examples include mapping information. For example, vehicles typically travel along streets that have been mapped in a variety of ways (e.g., Google maps, Bing maps, etc.). Along with other forms of information and based on a given location of the vehicle 375 at a particular time (e.g., via GPS, base station triangulation, etc.), the route of that vehicle may be predicted. Non-limiting examples of some of this other information include vehicle speed information, signal strength of the mobile device 115, traffic congestion, construction information, vehicle trajectory information, and route/destination programmed into the vehicle's GPS.

With a route of the vehicle 375 predicted, the processor 101 can coordinate which of the communication links 103 should deliver relatively high speed data to the vehicle 375. In this regard, the processor 101 may direct individual communication links 103 to "burst" portions of larger digital downloads through the communication link to the vehicle 375. That way, when the vehicle 375 is in communication with one of the directional communication links 103 and then traverses out of the communication capability of that link to another communication link 103, the processor 101 can resume the download via the other communication link 103.

Figure 7:
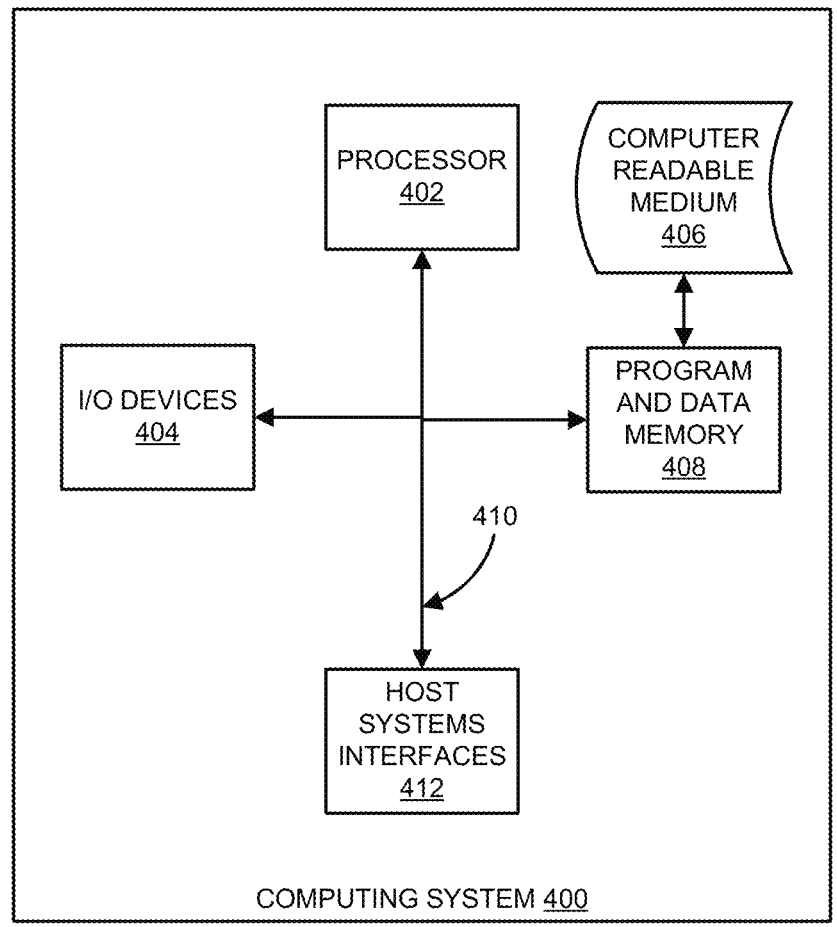
FIG. 7 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 7 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A communication system, comprising:
a Radio Frequency (RF) communication link operable to receive first communications from a mobile device;
a processor operable to determine a location of the mobile device based on the first communications; and
a plurality of directional communication links,
wherein each directional communication link is operable to initiate a data transfer to the mobile device based on the location of the mobile device determined by the processor, and wherein the processor is further operable to predict a subsequent location of the mobile device, and to coordinate handing off the data transfer based on the predicted location,
wherein handing off the data transfer comprises bursting a portion of requested data from a first directional communication link to the mobile device, halting transmission from the first directional communication link in response to completion of the burst, and bursting an additional portion of the requested data from a second directional communication link to the mobile device in response to halting transmission from the first directional communication link.

2. The communication system of claim 1, wherein:
at least one of the directional communication links is an optical communication link; and
the processor is further operable to reconfigure an optical intensity of the optical communication link, a beam width of the optical communication link, a focus of the optical communication link, or a combination thereof based on a detected quality of the optical communication link.

3. The communication system of claim 1, further comprising:
a Digital Micromirror Device (DMD) operable to receive the data via a first wavelength laser and to direct the first wavelength laser data to the mobile device, wherein the DMD is further operable to receive other data via a second wavelength laser and to direct the second wavelength laser data to another mobile device.

4. The communication system of claim 1, wherein:
at least one of the directional communication links is another RF communication link.

5. The communication system of claim 1, wherein:
each burst comprises a known amount of data.

6. The communication system of claim 1, wherein:
the processor is further operable to process an identifier from the mobile device to determine whether the mobile device is a subscriber of the data.

7. The communication system of claim 1, wherein:
one of the directional communication links comprises a laser and an actuator; and
the processor is operable to direct laser communications from the laser to the mobile device via the actuator.

8. The communication system of claim 1, wherein:
one of the directional communication links comprises a phased array antenna; and
the processor is operable to direct RF communications from the phased array antenna to the mobile device.

9. A method, comprising:
receiving first communications from a mobile device over a Radio Frequency (RF) mobile telephony link;
determining a location of the mobile device based on the first communications;
initiating a data transfer from a first directional communication link based on the determined location;
predicting a subsequent location of the mobile device; and
coordinating handing off the data transfer based on the predicted location, comprising:
bursting a portion of requested data from a first directional communication link to the mobile device;
halting transmission from the first directional communication link in response to completion of the burst; and
bursting an additional portion of the requested data from a second directional communication link to the mobile device in response to halting transmission from the first directional communication link.

10. The method of claim 9, wherein:
at least one of the directional communication links is an optical communication link; and
the method further comprises controlling an optical intensity of the optical communication link, a beam width of the optical communication link, a focus of the optical communication link, or a combination thereof based on a detected quality of the optical communication link.

11. The method of claim 9, further comprising:
receiving the data via a Digital Micromirror Device (DMD) at a first wavelength laser;
directing the first wavelength laser data to the mobile device via the DMD;
receiving other data via the DMD at a second wavelength laser; and
directing the second wavelength laser data to another mobile device via the DMD.

12. The method of claim 9, wherein:
at least one of the directional communication links is another RF communication link.

13. The method of claim 9, wherein:
each burst comprises a known amount of data.

14. The method of claim 9, wherein:
processing an identifier from the mobile device to determine whether the mobile device is a subscriber.

15. The method of claim 9, wherein:
one of the directional communication links comprises a laser and an actuator; and
the method further comprises directing laser communications from the laser to the mobile device via the actuator.

16. The method of claim 9, wherein:
one of the directional communication links comprises a phased array antenna; and
the method further comprises directing radio frequency communications from the phased array antenna to the mobile device.

17. A non-transitory computer readable medium, comprising instructions that, when executed by a processor in a communication system, direct the processor to:
receive first communications from a mobile device over a Radio Frequency (RF) mobile telephony link;
determine a location of the mobile device based on the first communications;
initiate a data transfer from a first directional communication link based on the determined location;
predict a subsequent location of the mobile device; and
coordinate handing off the data transfer based on the predicted location, comprising:
bursting a portion of requested data from a first directional communication link to the mobile device;
halting transmission from the first directional communication link in response to completion of the burst; and
bursting an additional portion of the requested data from a second directional communication link to the mobile device in response to halting transmission from the first directional communication link.

18. The computer readable medium of claim 17, wherein:
at least one of the directional communication links is an optical communication link; and
the instructions further direct the processor to control an optical intensity of the optical communication link, a beam width of the optical communication link, a focus of the optical communication link, or a combination thereof based on a detected quality of the optical communication link.

19. The computer readable medium of claim 17, further comprising instructions that direct the processor to control a Digital Micromirror Device (DMD) to:
receive the data via the DMD at a first wavelength laser;
direct the first wavelength laser data to the mobile device via the DMD;
receive other data via the DMD at a second wavelength laser; and
direct the second wavelength laser data to another mobile device via the DMD.

20. The computer readable medium of claim 17, wherein:
at least one of the directional communication links is another RF communication link.

* * * * *